United States Patent
Arntzen (10) Patent No.: US 9,422,946 B2
(45) Date of Patent: Aug. 23, 2016

(54) ANTENNA ASSEMBLY FOR PISTON ACCUMULATORS

(71) Applicant: MHWIRTH AS, Kristiansand (NO)

(72) Inventor: Ketil André Arntzen, Horten (NO)

(73) Assignee: MHWIRTH AS, Kristiansand (NO)

( * ) Notice: Subject to any disclaimer, the term of this patent is extended or adjusted under 35 U.S.C. 154(b) by 0 days.

(21) Appl. No.: 14/424,592

(22) PCT Filed: Aug. 27, 2013

(86) PCT No.: PCT/EP2013/067695
§ 371 (c)(1),
(2) Date: Feb. 27, 2015

(87) PCT Pub. No.: WO2014/033114
PCT Pub. Date: Mar. 6, 2014

(65) Prior Publication Data
US 2015/0247510 A1    Sep. 3, 2015

(30) Foreign Application Priority Data
Aug. 31, 2012 (NO) .................................. 20120980

(51) Int. Cl.
*F16L 55/04* (2006.01)
*F15B 1/04* (2006.01)
*H01Q 1/22* (2006.01)
*F15B 1/24* (2006.01)
(Continued)

(52) U.S. Cl.
CPC ... *F15B 1/04* (2013.01); *F15B 1/24* (2013.01); *F15B 13/16* (2013.01); *G01S 13/88* (2013.01); *H01Q 1/225* (2013.01); *F15B 15/2869* (2013.01); *F15B 2201/205* (2013.01); *F15B 2201/31* (2013.01); *F15B 2201/415* (2013.01); *F15B 2201/515* (2013.01)

(58) Field of Classification Search
USPC .......................................................... 138/30, 31
See application file for complete search history.

(56) References Cited

U.S. PATENT DOCUMENTS

| 4,768,594 A * | 9/1988 | Akkerman | E21B 34/06 |
| | | | 166/319 |
| 4,901,628 A | 2/1990 | Krage | |

(Continued)

FOREIGN PATENT DOCUMENTS

| DE | 19833220 A1 | 6/1999 |
| DE | 10205904 A1 | 8/2003 |

(Continued)

*Primary Examiner* — James Hook
(74) *Attorney, Agent, or Firm* — Birch, Stewart, Kolasch & Birch, LLP (57) ABSTRACT

A replaceable antenna assembly for use with a piston accumulator configured for supplying fluid to a hydraulic cylinder is provided. The antenna assembly includes a hollow manifold for flow of fluid and an antenna connected into or onto the manifold for emitting and receiving electromagnetic waves. The hollow manifold is connectable to and configured to be in fluid communication with both the piston accumulator at one end and a pressure line at the other end. The pressure line is connectable to an external high pressure gas bank. The antenna assembly further includes at least one first bore for transferring signals to and from the antenna and at least two fluid channels symmetrically displaced around the circumference of the antenna, thereby ensuring that most of, or all, fluid flows on the radial outside of the antenna during use.

8 Claims, 10 Drawing Sheets

(51) Int. Cl.
  *F15B 13/16* (2006.01)
  *G01S 13/88* (2006.01)
  *F15B 15/28* (2006.01)

(56) References Cited

U.S. PATENT DOCUMENTS 5,780,743 A * 7/1998 Morgan .............. F15B 15/2869
                                                    324/633
2005/0191027 A1    9/2005 Trummer 2012/0174771 A1 * 7/2012 De Maglie .......... F15B 15/2869
                                                    92/5 R
2015/0233399 A1 * 8/2015 Arntzen .............. F15B 15/2869
                                                    92/5 R

FOREIGN PATENT DOCUMENTS

| DE | 102008056886 | B3 | 10/2009 |
| EP | 2000823 | A1 | 12/2008 |
| EP | 2017644 | A1 | 1/2009 |

* cited by examiner

ANTENNA ASSEMBLY FOR PISTON ACCUMULATORS

FIELD OF THE INVENTION

The invention relates to an antenna assembly for use with a piston accumulator or a single acting cylinder, as well as an accumulator end assembly comprising the antenna assembly.

BACKGROUND OF THE INVENTION

In connection with offshore oil and gas exploration where floating vessels such as drilling rigs or drilling ships are connected to the seabed via a drill string, riser or any other seabed connected equipment, it is a need for compensation systems suitable for compensating movements of the floating vessel normally caused by natural phenomena such as waves and winds. If there were no such compensating systems the seabed connected equipments could be damaged or deteriorated due to for example buckling and/or tension.

A central part of this compensation system is one or more hydraulic pressure cylinders which is in fluid connection with one or more piston accumulators. The purpose of the piston accumulators is to ensure that the high pressure chamber within the hydraulic pressure cylinder is maintained under pressure. The piston accumulators are normally of air/oil type and comprise a floating accumulator piston separating hydraulic fluid in one part of the accumulator from the compressed air (or other fluids) in the other part of the piston accumulator. The latter part, e.g. with the compressed air, may be connected through a pneumatic pressure line to a high pressure gas bank of compressed gas used to maintain a predetermined high pressure level in the piston accumulator. Further, the hydraulic fluid is in fluid communication via a hydraulic pressure line to the high pressure chamber of the hydraulic pressure cylinder. When the compensating system is being operated, hydraulic fluid is forced from the piston accumulator through the pressure line and into the high pressure chamber of the hydraulic pressure cylinder where a hydraulic force is exerted on the face of a cylinder piston. The pressure developed on the floating accumulator piston maintains the hydraulic fluid pressure in the piston accumulator and the high pressure chamber of the hydraulic pressure cylinder as the volume of the high pressure chamber changes. Hence, when the floating vessel experiences movements, such as heaves downward relative to the riser, the cylinder housing is displaced down with respect to the cylinder piston, thereby increasing the volume of the high pressure chamber of the hydraulic pressure cylinder.

For the detection and recording of the position of the floating piston in the piston accumulators, it is generally known to use distance measuring devices such as an antenna which can be used to measure the distance between the piston(s), serving as a reflecting body inside the piston accumulator, and the accumulator base which holds an antenna. The detection of the piston position in accumulators can be performed either discrete, i.e. at discrete sites, or continuous, i.e. continuously during operation. The antenna and antenna cable are normally formed as a part of the end cover of the accumulator or is mounted between the high pressure chamber in the accumulator and the end cover. Prior art solutions include arrangements wherein the whole upper end, including e.g. flanges and end covers, of the piston accumulator has to be removed if a minor part such as an antenna or antenna cable must be replaced. The size and weights of these components, e.g. flanges and end covers, mounted on pressure cylinders are massive. Hence, to change or repair an antenna, transmittal line or other part, may prove difficult due to the dimensions and weights of the flanges and end covers.

It is therefore an object of the present invention to provide a solution that makes it easy to substitute or repair the antenna or transmittal line without the need of dismounting the larger elements making up the upper end of a piston accumulator.

Another object of the invention is to provide a solution where the antenna is kept centrally within the piston accumulator while removing the antenna and/or transmittal line.

SUMMARY OF THE INVENTION

The invention is set forth and characterized in the independent claims, while the dependent claims describe other characteristics of the invention.

The invention regards a replaceable antenna assembly for use with a piston accumulator configured for supplying fluid to a hydraulic cylinder, the antenna assembly comprises;
 a hollow manifold for flow of fluid, and
 an antenna connected into or onto the manifold for emitting and receiving electromagnetic waves,
wherein the hollow manifold is connectable to and configured to be in fluid communication with both the piston accumulator at one end and a pressure line at the other end, said pressure line being connectable to an external high pressure gas bank. The antenna assembly further comprises;
 at least one first bore for transferring signals to and from the antenna, and
 at least two fluid channels symmetrically displaced around the circumference of the antenna, thereby ensuring that most of, or all, fluid flows on the radial outside of the antenna during use.

In an embodiment of the antenna assembly the geometrical shape of the at least two fluid channels ensures essentially laminar flow throughput between the manifold and the interior of the piston accumulator.

The at least one fluid channel is adapted for fluid flow in both directions. The fluid may preferably be gas.

In one embodiment at least one transmittal line may be arranged in the at least one first bore for the transfer of signals.

The outer circumference of the manifold may be exposed to the surroundings. This enables direct access to the transmittal line from the outside of the antenna assembly and makes possible to substitute the antenna without removing the end cover of the piston accumulator.

In a preferred embodiment the antenna assembly comprises two or more fluid channels. The fluid channels may be evenly spaced around the antenna, shaped as a fan. In a preferred embodiment the channels are symmetrical channels displaced around the circumference of the antenna.

There may be arranged seals to ensure fluid-tight sealing in the connections between the manifold and the external high pressure line and between the manifold and the piston accumulator, respectively. The seals may be any seals providing a fluid-tight connection, such as O-ring seals or similar. Additionally it may be arranged seals between the manifold and the antenna. The seal may form part of a locking ring, or alternatively, form part of the manifold. The locking ring may have internal threads that correspond to external threads on the antenna, and be provided with screw holes provided for connection with the manifold through a second set of screws. The locking ring may have different shapes, including a housing-shape enclosing the upper part of the antenna. The upper part of the locking ring may be a whole disc or a partial disc with a hole for the transmittal line.

The at least one first bore may comprise a first bore orifice in the end closest to the outer circumference of the manifold for providing a fluid-tight connection around the transmittal line. The fluid-tight first bore orifice closes around said transmittal line. The first bore orifice may be of a resilient material.

The invention further concerns an accumulator end assembly comprising;
  an antenna assembly,
  an end cover of an accumulator, which end cover comprises at least one gas channel. The inner surface of the gas channel may in be smooth to ensure essentially laminar flow. The gas channel may be drilled hole(s) through the end cover.

In an embodiment, the manifold can be provided with a first bore orifice. The first bore orifice can be made by prefabricated threads or flange connection for connection to a pipe, tube, hose or similar through which the transmittal line is continued.

In a preferred embodiment the smallest cross sectional area of the end cover is larger than the largest cross sectional area of the antenna and the part of the manifold holding the antenna, such that the manifold and antenna can be removed out of and into the end cover.

In the following examples a reflector will be disclosed which is connectable with the above mentioned inventive antenna assembly. Such a reflector may comprise a reflector disc, an elongated body such as tubes having a first longitudinal end and a second longitudinal end, where the first longitudinal end is fastened to the reflector disc and the second longitudinal end being fastenable to an accumulator piston. The elongated body of the reflector may further comprise two or more telescopically interconnected reflector tubes making possible reversible adjustment of the elongated body's longitudinal length around a predetermined equilibrium length.

The reflector is suitable for reflecting electromagnetic waves emitted into a conducting structure from at least one antenna situated at a distance from the reflector, which distance is calculated based on measured emitted and reflected waves to and from the reflector, respectively.

The reversible property may be ensured by the arrangement of one or more resilient means positioned along at least a part of the body's longitudinal length, preferably along a major part of the length or the entire length. An example of such a resilient means may be a spring, a bellow or any material with intrinsic resilient properties. Instead of extending outside the body such resilient means may also be arranged in any hollow part/cavity of the body, or a combination thereof.

Advantageously, the reflector is configured with a first fluid channel extending from a confined space surrounding the elongated body, subsequently through at least a part of the body's longitudinal length and the reflector disc, and finally through at least one exit opening to a space located at the opposite side of the disc compared to the confined space.

Preferably, such a reflector disc is further provided with one or more fluid reflector channels/chambers situated inside the disc, thereby forming an integral part of the first fluid channel when appropriate fluid communication between at least one of the first fluid channel(s) and at least one of the reflector channel(s)/chamber(s) is established. This or these fluid reflector channel(s) may be produced by simple drilling along the radial orientation of the reflector disc. Of course, a skilled person would contemplate other alternative embodiments resulting in the desired fluid reflector channel(s)/chamber(s), for example by assembling two or more plates in a layer-by-layer configuration having suitable internal framework.

Further, the reflector disc may be configured with one or more fluid flow openings, thereby ensuring pressure equalization or near pressure equalization on both sides of the disc relative to the longitudinal axis of the elongated body when the reflector is arranged in a pressurized piston accumulator and in use. Alternatively or in addition, the disc may be smaller than the inner diameter/cross section of the accumulator. However, in a preferred embodiment the reflector is designed as a circular or near circular shaped reflector disc having an outer disc diameter enabling a tight fit or near tight fit with the internal radial diameter of an essentially cylindrical piston accumulator.

As mentioned, the reflector in accordance with the above disclosure may be positioned inside a piston accumulator, where the latter is suitable for supplying hydraulic fluid to a hydraulic cylinder. Such a piston accumulator may, in addition to the reflector, comprise a piston separating the piston accumulator into two fluid tight chambers, namely a hydraulic fluid pressure chamber for containing pressurized hydraulic fluid and a gas pressure chamber for containing pressurized gas. Note that other fluids or pressure situations may be feasible inside the chambers. The distance inside the piston accumulator between one of the interior ends of the accumulator relative to the longitudinal axis of the elongated body, for example the end situated in the gas pressure chamber, and the surface of the piston situated within the accumulator and facing towards said interior end, is during operation continuously or discretely measured by use of electromagnetic waves reflected on the reflector. The second longitudinal end of the reflector is in this accumulator fastened to the perpendicular oriented surface of the piston facing towards said end. In the accumulator the first fluid channel may advantageously continue through one or more second channel(s) running at least partly through an accumulator end assembly. This or these second channel(s) in fluid communication with the first fluid channel may exit to the exterior surrounding of the accumulator through a drainage valve.

In addition to the reflector and the piston accumulator, a method for determining a distance (d) between an antenna and a piston situated in the above mentioned piston accumulator is disclosed that likewise may be used in connection with the inventive antenna assembly. The method may comprise the following steps:
  arranging an antenna assembly into an accumulator end assembly, the antenna assembly comprising a manifold, at least one antenna arranged on or inside the manifold, and at least one antenna transmittal line in signal communication with the at least one antenna from the exterior surrounding of the accumulator, wherein at least one antenna emitting end capable of emitting waves is aligned with the accumulator interior end,
  filling and pressurizing fluids into the hydraulic fluid pressure chamber and the gas pressure chamber for fulfilling the requirements set by the particular application of the piston accumulator,
  emitting at least one electromagnetic wave of at least one frequency from at least one antenna emitting end in direction towards the reflector,
  receiving at least one reflected wave that has been reflected by the reflector disc,
  measuring the distance (d') between the at least one antenna emitting end and the reflector disc based on analyzing the phase difference between at least one of the emitted wave(s) and at least one of the received wave(s) and
  adding the predetermined distance ($\Delta d$) between the reflector disc and part of the accumulator piston oriented parallel to the reflector disc to obtain the desired distance ($d = d' + \Delta d$) to the accumulator piston.

One relevant application of the piston accumulator is in connection with its use in a compensation system on a floating vessel for dynamically maintaining a riser or drill string under sufficient tension during vessel movements such as heaves. The pressurized hydraulic fluid present in the accumulator's hydraulic fluid pressure chamber is set in fluid communication with a hydraulic cylinder via a fluid line, thereby providing the sufficient pressure and thus the sufficient hydraulic force on the riser/drill string.

In the following description, numerous specific details are introduced to provide a thorough understanding of, and enabling description for, embodiments of the claimed apparatus and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

These and other characteristics of the inventive antenna assembly will be clear from the following description of a preferential form of embodiment, given as a non-restrictive example, with reference to the attached drawings wherein;

FIGS. 8 A and B show perspective views of an assembled reflector,

DETAILED DESCRIPTION OF A PREFERENTIAL EMBODIMENT

Figure 1:
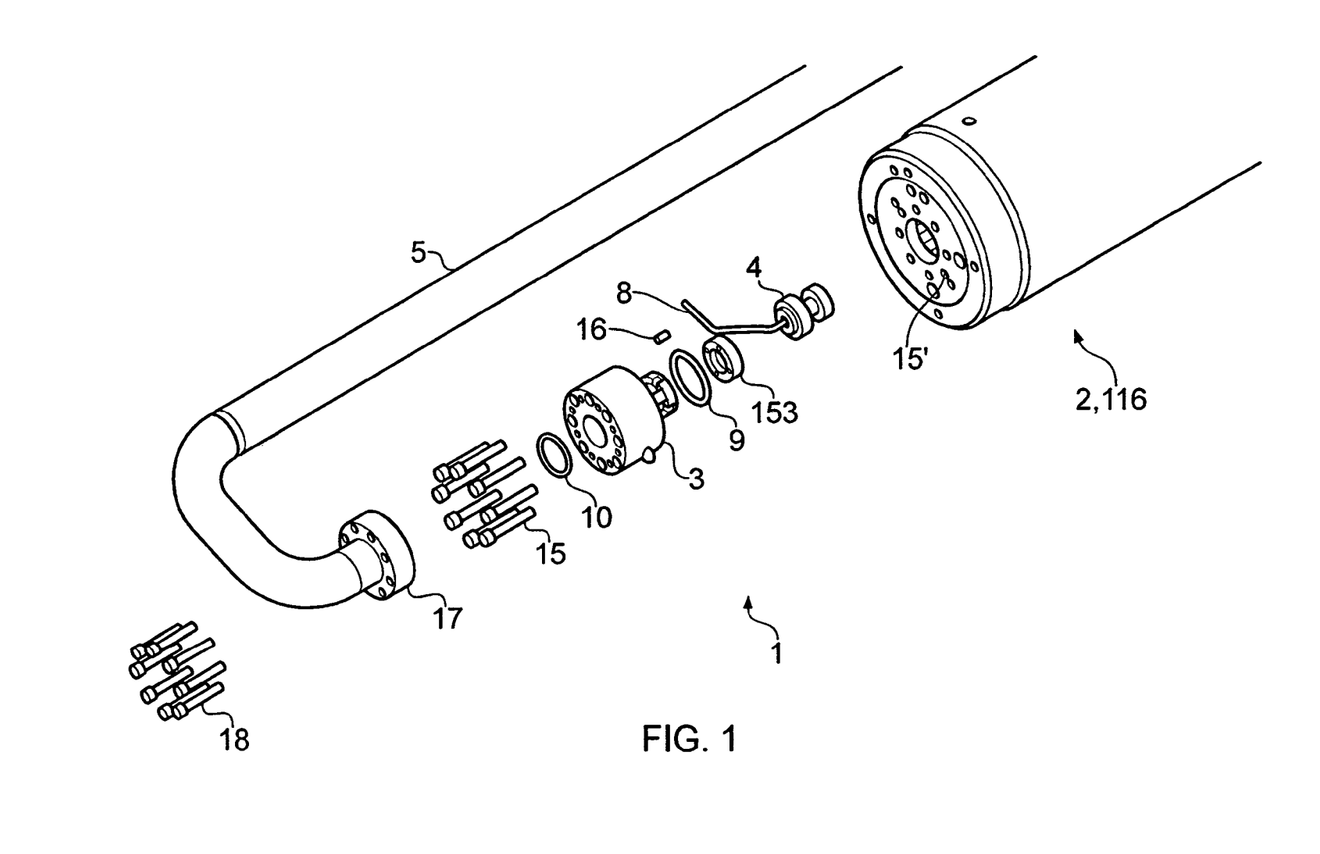
FIG. 1 shows an exploded view of an accumulator, a pressure line and the antenna assembly according to the invention.
Figure 4:
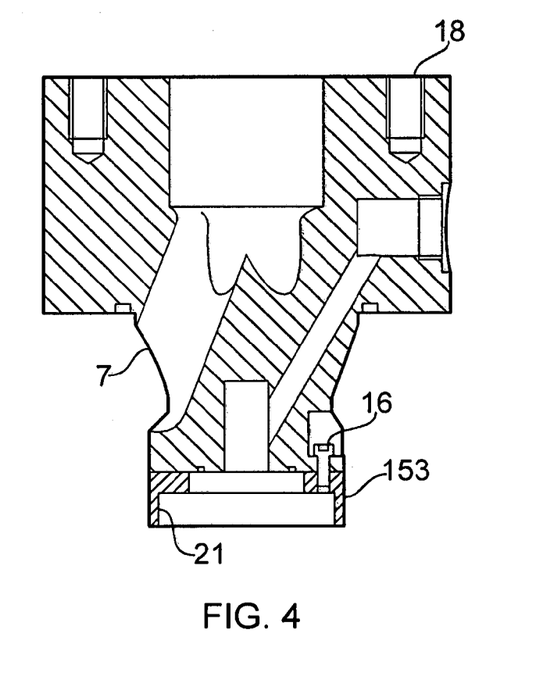
FIG. 4 shows a side view of one of the fluid channels in the manifold.

FIG. 1 shows an exploded view of a piston accumulator 2,116, a pressure line 5 and an antenna assembly 1 in which the latter further comprises a manifold 3 according to the invention. The antenna assembly 1 may be used to measure the distance (d) between an end 126 of the assembly 1 and a reflector 100 situated inside the piston accumulator 2,116. A first set of screws 15 connects the manifold 3 to corresponding screw holes 15' in an end cover 12 on the piston accumulator 2. A second set of screws 16 connects a locking ring 153 to the manifold 3 and the antenna 4 is connected to the locking ring by means of a threaded cavity 21 (FIG. 4). A first sealing element 9 ensures a fluid-tight seal between the manifold 3 and the end cover 12, while a second sealing element 10 ensures a fluid-tight seal between the manifold 3 and a flange 17 at the end of the pressure line 5. A third set of screws 18 connects the flange 17 on the pressure line 5 to the manifold 3. The pressure line 5 is connected to an external pressure source (not shown) such as a high pressure gas bank.

Figure 2:
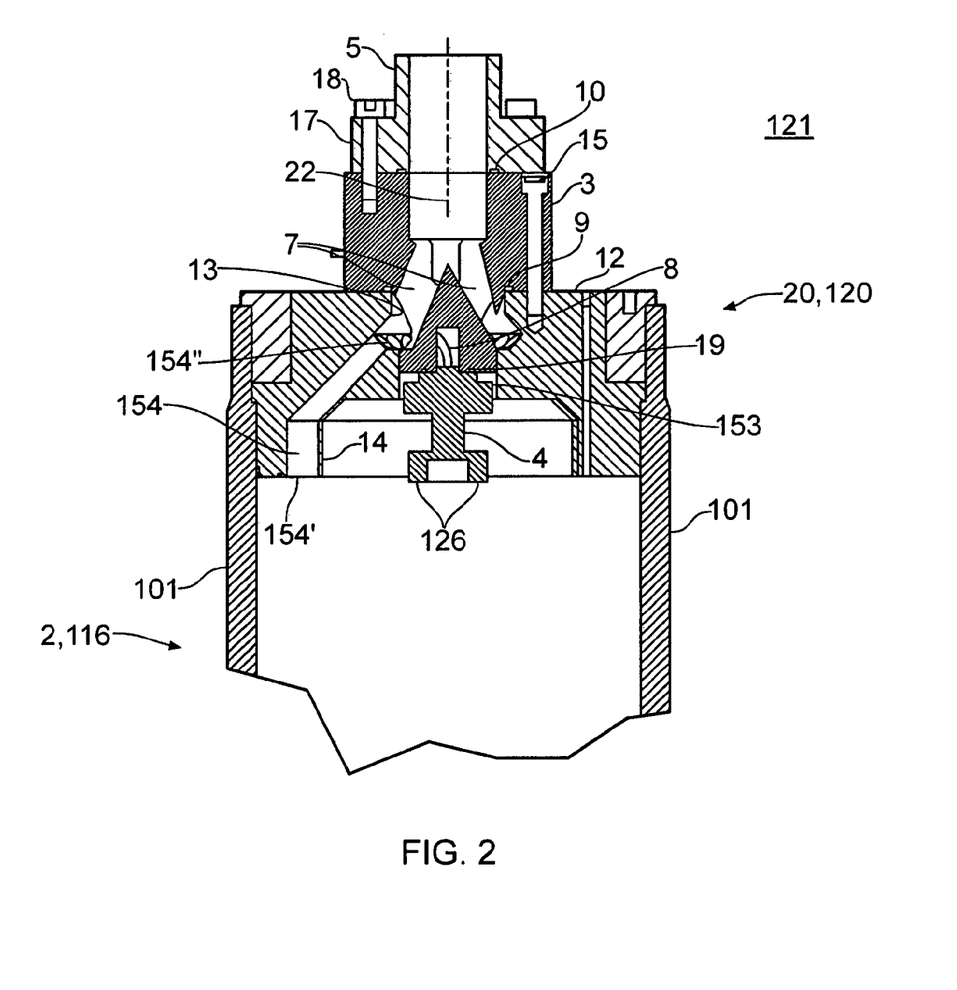
FIG. 2 shows a vertical cross-section of the antenna assembly according to the invention.

FIG. 2 shows a vertical cross-section of the manifold 3 according to the invention, including two fluid channels 7. Fluid flowing through pressure line 5 enters the manifold 3 at the upper end (seen in the figure) through a common fluid inlet 22 having the same shape and inner cross-sectional area as the inner cross-sectional area of the pressure line 5. The common fluid inlet 22 diverges into a number of fluid channels 7. Each of the fluid channels 7 guides the fluid into the high/pressure gas chamber 116" within the accumulator 2 through the end cover 12. During use, the antenna 4, including the transmittal line 8, is connected to the manifold 3 by means of the locking ring 153 and the second set of screws 16. A second sealing element 19, e.g. an o-ring, seals the connection. The shape of the end cover 12 secures minimal flow resistance between the manifold 3 and the high/pressure gas chamber within the accumulator 2. The end cover 12 extends in the longitudinal direction and defines a number of gas channels 154 having a gas channel inlet 154' and a gas channel outlet 154". The gas channels 154 are in fluid connection with the fluid channels 7 and extend around an outer radial circumference of the antenna 4 in an axial inclination relative a longitudinal axis of the antenna 4. The cross-sectional area of the fluid channels 7 and gas channels 154 are configured to ensure minimal obstruction of fluid flowing through the manifold 3 and end cover 12. It is seen in FIG. 2 that the gas channels 154 forms a 'fan-shape' around the radial outside of the antenna 4.

If, for instance, the transmittal line 8 needs to be replaced, the third set of screws 18 is loosened. The first set of screws 15 then becomes accessible and is loosened. Since the lower part of the manifold 3 and locking ring 153 holding the antenna 4 has a smaller outer cross-sectional area than the smallest inner cross-sectional area of the end cover 12, the manifold 3 and antenna 4 can be removed without the need of dismounting the upper end of the accumulator 2, including e.g. the end cover 12, flanges etc.

Figure 3:
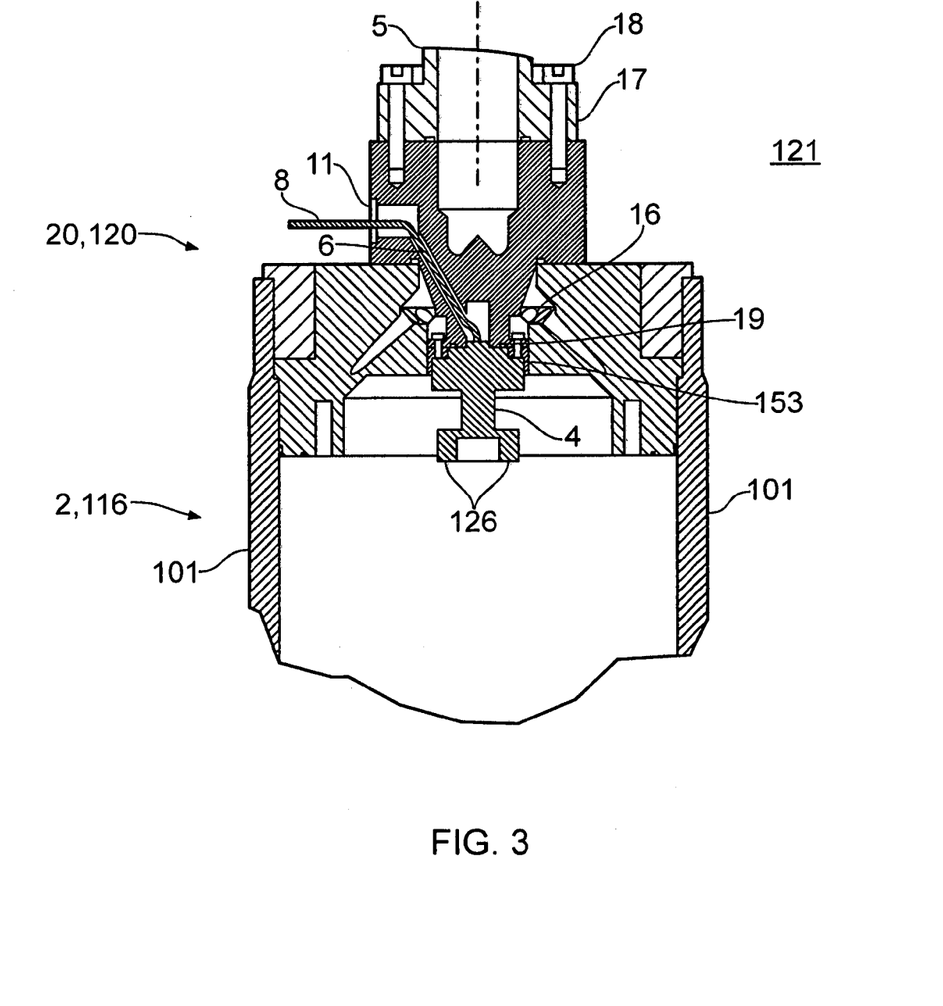
FIG. 3 shows another side-view of a vertical cross-section of the antenna assembly according to the invention.

FIG. 3 shows a vertical cross section as in FIG. 2 from another lateral angle where the manifold 3 according to the invention is seen, including a first bore 6 extending from the lower part of the manifold 3 to an outer circumference of the manifold 3, which outer circumference forms a part of the manifold 3 that is directly exposed to the surroundings 121 (air, water etc.). The first bore 6 has a first bore orifice 11 at the end closest to the outer circumference of the manifold 3. The first bore orifice 11 is preferably configured fluid-tight around the transmittal line 8. The transmittal line 8 is connected to the antenna 4 and extends through the first bore 6, ending up on the radial outside of the manifold 3. A third sealing element 19 seals the connection between the manifold 3 and the antenna 4 and a locking ring 153 is screwed on the antenna 4 and may in one embodiment be provided with holes for connection with the manifold 3 through the second set of screws 16.

FIG. 4 shows a side view of a fluid channel 7 in the manifold 3. In the lower part of the manifold 3 the locking ring 153 having a cavity 21 adapted for receiving or holding the antenna (the antenna is not shown in this figure) is shown. The location of the second set of screws 16 and the locking ring 153, connecting the manifold 3 to the antenna 4, are also shown. The lower part of the third set of screws 18 is shown in the upper part of the figure.

Figure 5:
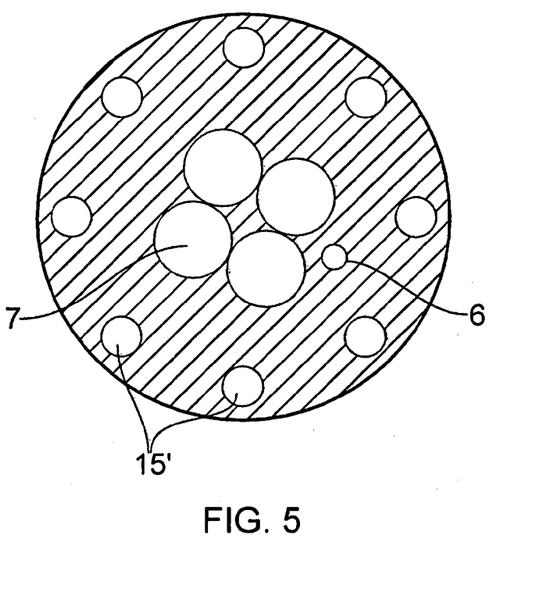
FIG. 5 shows a cross-sectional view along line A-A in FIG. 6.
Figure 6:
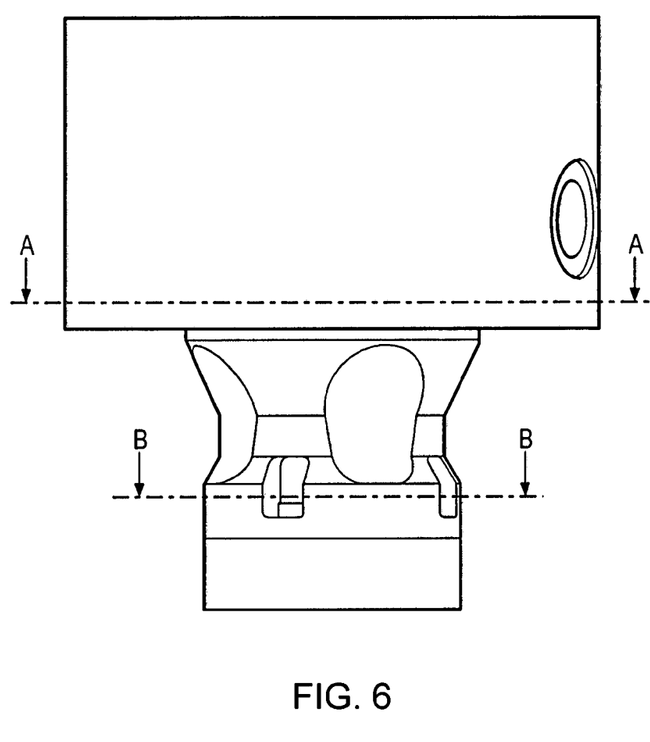
FIG. 6 shows a side view of the manifold and locking ring.

FIG. 5 shows a cross-sectional view along line A-A in FIG. 6. The arrangement of four fluid channels 7, the first bore 6 and the corresponding screw holes 15' are shown.

FIG. 6 shows a side view of the manifold and locking ring.

Figure 7:
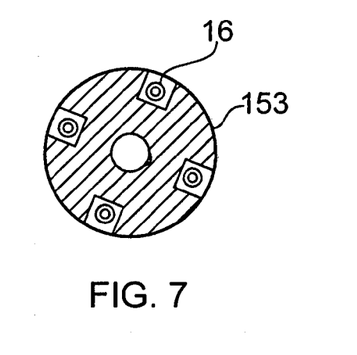
FIG. 7 shows a cross sectional view of line B-B in FIG. 6.

FIG. 7 shows a cross sectional view of line B-B in FIG. 6, including the second set of screws 16 and the locking ring 153.

Figure 8A:
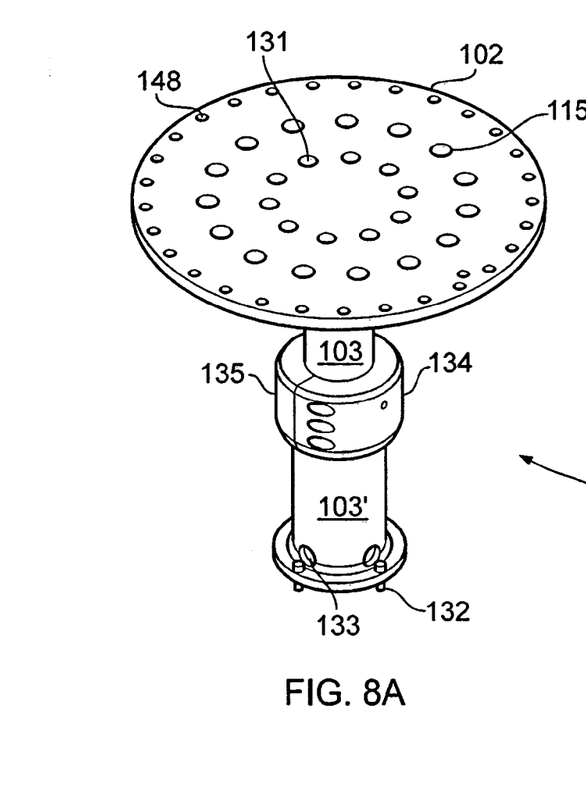
Figure 8B:
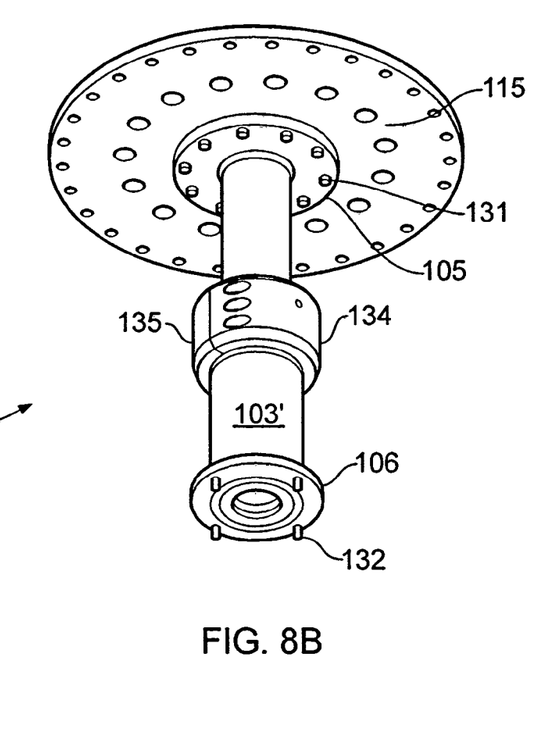

In the following, details of a reflector 100 suitable for receiving and reflecting any electric wave from the antenna 4, will be given. In FIGS. 8 A and B perspective views of the assembled reflector is shown in two different angles.

Figure 9:
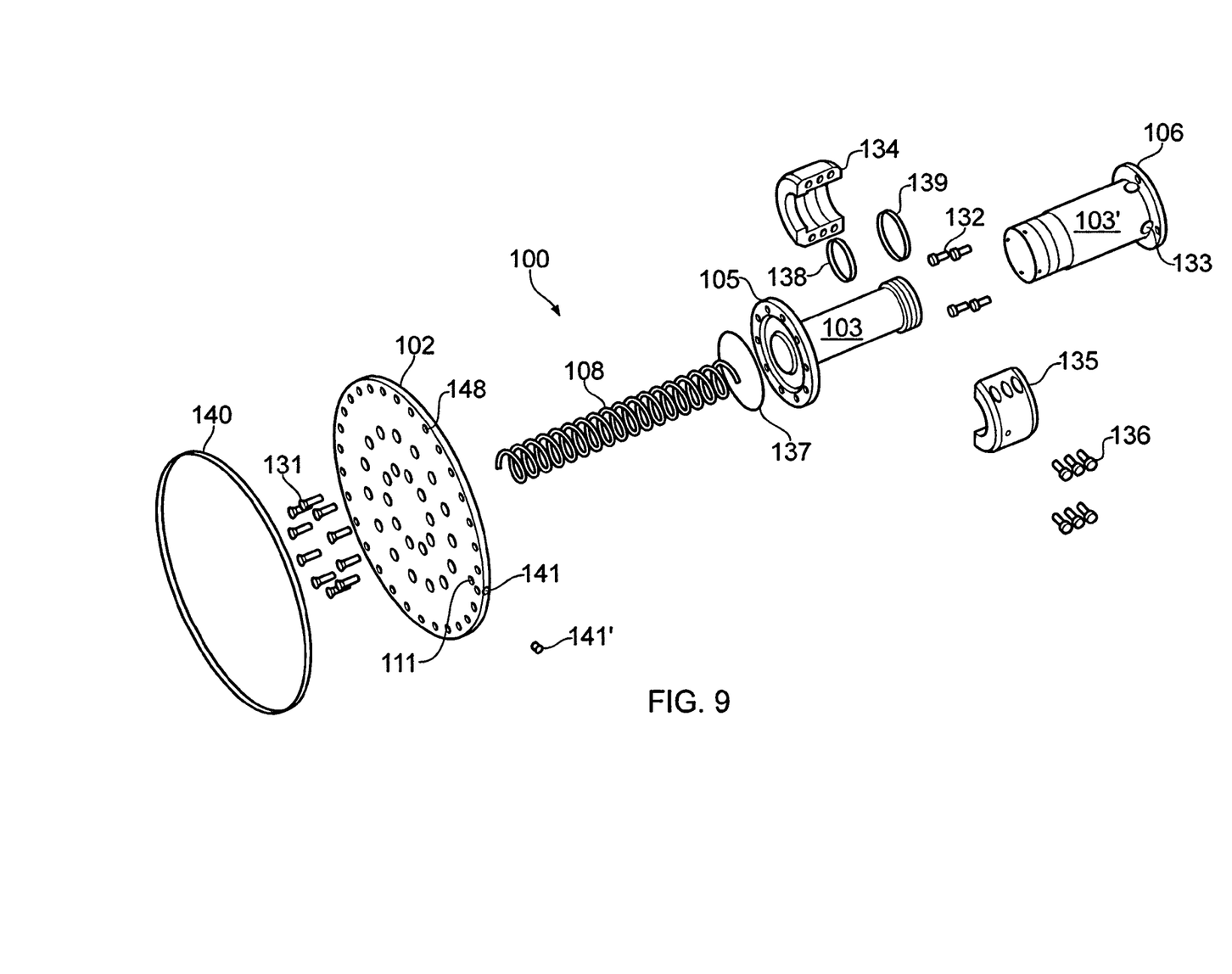
FIG. 9 shows a perspective exploded view of the reflector according to FIGS. 8 A and B.
Figure 10:
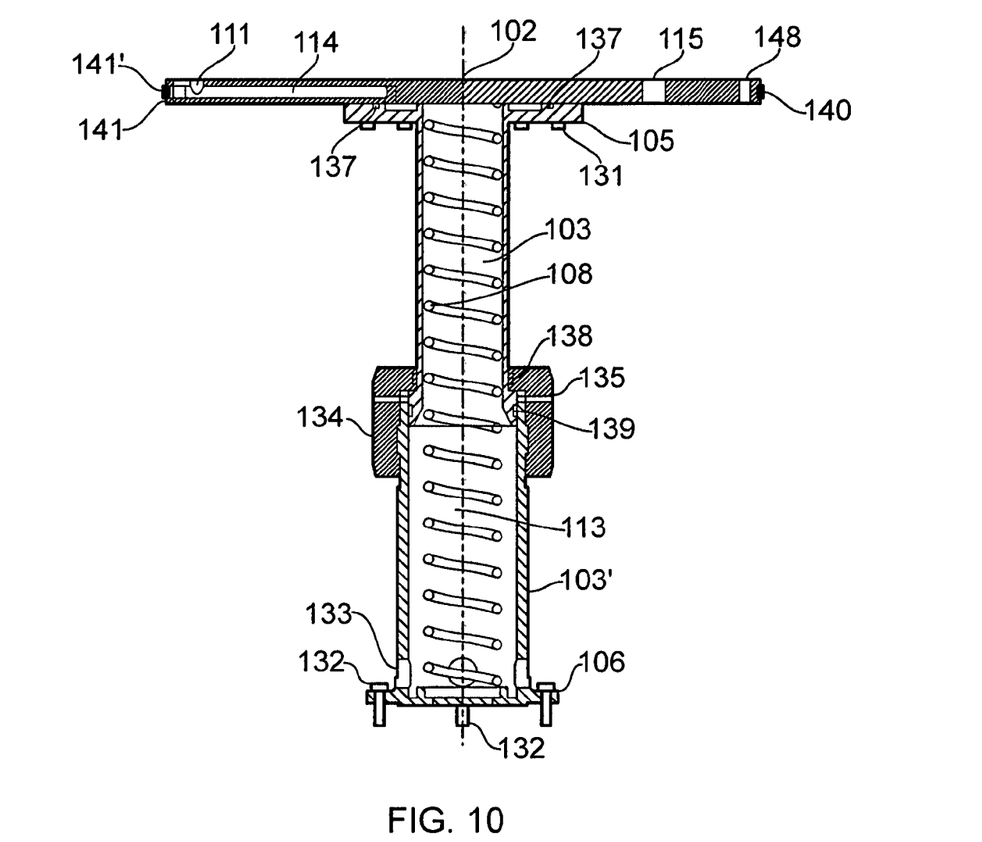
FIG. 10 shows a further detailed sectional view of the assembled reflector according to FIGS. 8 A and B.
Figure 11:
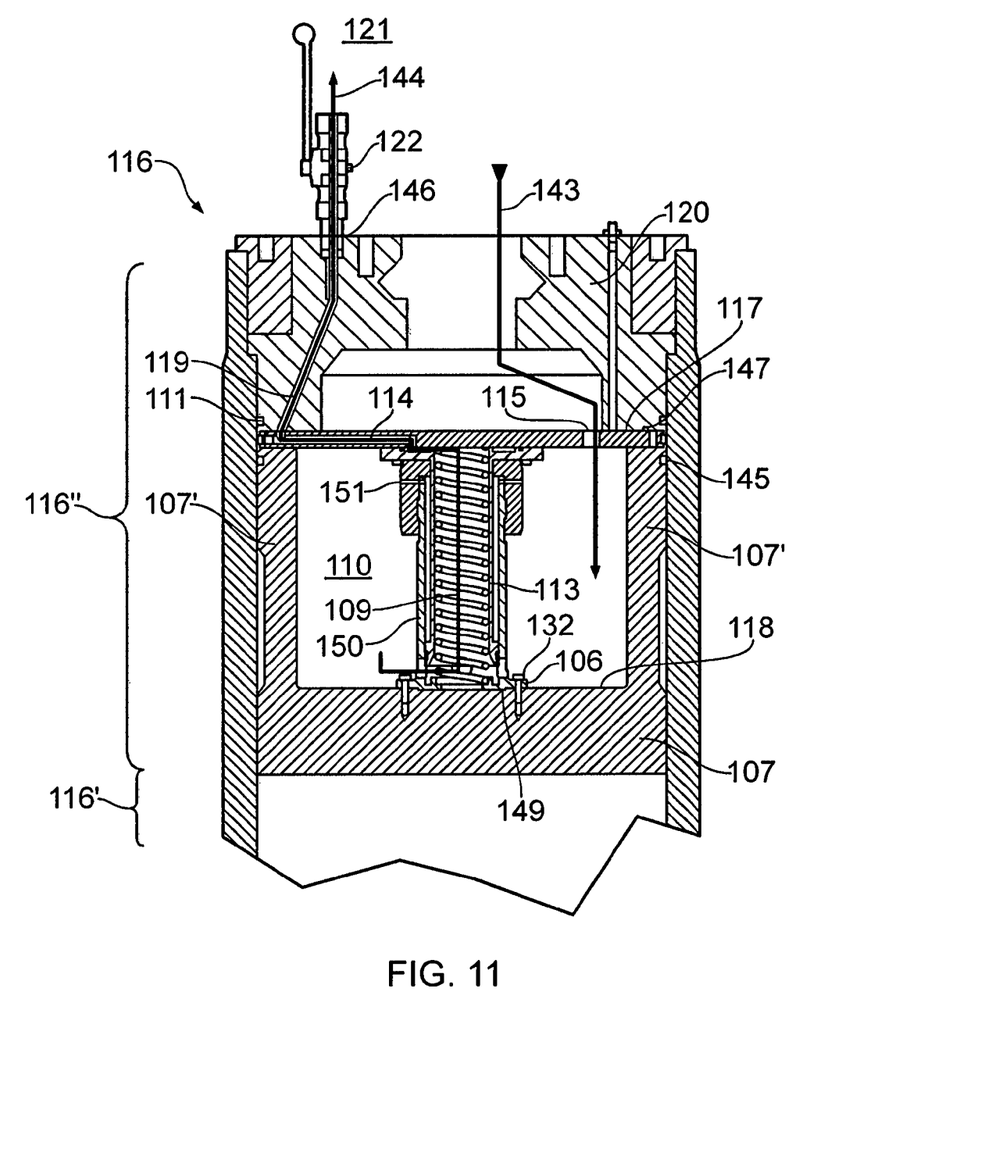
FIG. 11 shows a sectional view of the assembled reflector according to FIGS. 8 A and B, installed in an accumulator.

In the embodiment the reflector is shown to comprise a reflector disc 102, an elongated body 103,103' having a first flange 105 and a second flange 106 at its longitudinal ends, wherein the first flange 105 is fastened to the reflector disc 102 and the second flange 106 is suitable for being fastened to an accumulator piston 107,107' (FIG. 11). Said fastening to the reflector disc 102 and the accumulator piston 107,107' can be achieved by use of first fastening means 131 and second fastening means 132, respectively, for example threaded screws and/or bolts. The elongated body 103,103' comprises several telescopically arranged tubes 103,103', where the tube 103 is fastened to adjacent surface of the reflector disc 102. The different tubes 103,103' are telescopically slidable relative to each other in their longitudinal direction (FIG. 9). To ensure reversibility of the predetermined equilibrium distance between the piston 107,107' and the reflector disc 102 after for example a reflector contraction due to removal/reduction of the pressure on the lower pressure side of the accumulator piston, a resilient means 108 such as a pressure spring (FIG. 9) may be arranged inside the elongated body 103,103' extending at least partly from near the second flange 106 to near the first flange 105. Further the elongated body 103,103' is shown in FIGS. 8A, 8B and 9 as hollow, where the hollow part 113 of the body 103,103' is arranged to be in fluid communication with reflector channel(s)/chamber(s) 114 (FIG. 10) inside the reflector disc 102. By arranging one or more entrance openings/apertures 133 near the second flange 106 going into the hollow part 113, and one or more exit openings/apertures 111 going from the one or more of the reflector chambers 114 being in fluid communication with the hollow part 113 and into a reflector space 112 (FIG. 12) located above the disc 102, a complete first fluid channel 109,114 (FIG. 11) is provided making fluid draining of a confined space 110 surrounding the elongated body 103,103' possible. Such drainage may be controlled by an appropriate drainage valve 122 and maintained by the elevated pressure in the confined space 110, and/or set up by an exterior pump (not shown).

The telescopic links are in the embodiment of FIGS. 8 and 9 covered by a first and second adapter sleeve 134,135 and joined together by third fastening means 136. The purpose of the sleeves is both to ensure stable telescopic movements and to prevent that one or more of the telescopic tubes 103,103' disconnects.

Further, inner and outer fluid flow openings 115,148 penetrating the reflector disc 102 ensure pressure equalization on both sides when it is positioned in a piston accumulator 116, the latter being separated by the accumulator piston 107,107' into a hydraulic fluid pressure chamber 116' and a gas pressure chamber 116".

FIG. 9 shows the reflector 100 in further details, where the different components are shown in exploded view for the sake of clarity. In addition to the illustrated components in FIG. 8 the resilient means 108 in the form of a spring is clearly shown situated inside the elongated body 103,103'. The latter is exemplified as composed of in total two telescopically arranged tubes 103,103', hereinafter referred to as first elongated body 103 and second elongated body 103', but may be extended to more tubes if necessary/advantageous.

To ensure leakage free fastening onto the reflector disc 102 the reflector 100 is in this embodiment arranged with one or more gaskets 137 (FIG. 10) between the first flange 105 and the contact surface of the reflector disc 102. In addition, first 138 and second 139 guiding bands are situated between the adapter sleeves 134,135 and the uppermost tube 103, and between the uppermost tube 103 and the lowermost tube 103', respectively (see also FIG. 10). The purpose of these bands 138,139 is primarily to ensure stable and smooth relative movements during contractions and elongations. Likewise, a disc guide band 140 may advantageously be arranged around the circumference of the reflector disc 102 to facilitate its longitudinal movement. within the surrounding piston accumulator 2,116, as well as to increase the overall stability and suppress any vibrations. The smooth and stable longitudinal movements set up by the various guiding bands 138-140 are desired since an elevated friction e.g. between the reflector disc 102 and the inner walls of the piston accumulator 116 causes a decrease in predictability during operations.

Finally, to prevent any fluid communication with the fluid reflector channel(s)/chamber(s) 114 drilled into the reflector disc 102 during use a disc opening 141 with a corresponding plug 141' is arranged at the circumference of the disc 102, as seen in FIGS. 9 and 10.

FIG. 10 shows the non-exploded reflector 100 of FIG. 9 in a schematic view, in which the above mentioned first fluid channel 109,114 comprising the entrance openings 133, the hollow part 113, the reflector bore hole 114 and the exit opening 111 is illustrated, together with the disc opening 141 and corresponding plug 141'.

In the embodiment schematically illustrated in FIG. 11 the above disclosed reflector 100 is shown arranged above a piston 107,107' in a piston accumulator 2,116, which accumulator 2,116 may form part of a compensation system onboard a floating vessel. The accumulator piston 107,107' is illustrated with the shape of a squared cup having a piston base 107 with an inner piston surface 118 and axial protruding side(s) 107', onto which surface 118 the reflector 100 is situated using the second fastening means 132. However, the shape of the piston 107,107' may take any form that ensures a fluid tight separation of the two fluid phases on each of its axial sides. Proper centering on the piston surface may be facilitated by for example one or more guiding tracks 149. The FIG. 11 shows the accumulator piston 107,107' fully displaced, i.e. where the surface of the reflector disc 102 facing away from the piston abuts an inner surface 117 of an accumulator end assembly 20,120. In this position, which is the consequence of a lower pressure in the confined space 110 surrounding the elongated body 103,103' relative the other, hydraulic fluid side of the piston 107,107', the contact surfaces of the axial protruding side(s) 107' abut the surface on the reflector disc 102 facing towards the side of the elongated body 103,103'. This particular pressure situation may occur when the pressure from the pressure vessels/banks (not shown) providing pressure to the gas pressure chamber 116" is decreased, for example due to the need of replacing any lubrication fluid 142. The thick, downward directed arrow 143 in FIG. 11 indicates the free flow path for any fluid entering the gas pressure chamber 116" through one or more fluid openings 115 in the reflector disc 102 into confined space 110 surrounding the elongated body 103,103'. Likewise, the thick, mainly upward directed arrow 144 indicates the fluid escape path (common first 109,114 and second 119 fluid channels) during draining of any fluid 142 present at the piston 107,107' within the gas pressure chamber 116", that is, through the one or more entrance openings 133 situated the lower part of the lower tube 103', further through the hollow part 113 in the elongated body 103,103', through the fluid reflector chamber/channel 114 inside the reflector disc 102, further through the one or more exit openings 111 into the accumulator end assembly 20,120 facing side of the reflector disc 102, and finally through the accumulator end assembly 20,120 to the outside of the accumulator 2,116. The presence of fluid 142 to be drained may be due to for example intentional entry of lubrication liquid for lubricating any piston seals 145 and/or leakage of hydraulic fluid across the piston 107,107'. To enable controlled drainage out to the exterior surroundings 121 of the accumulator 2,116 a drainage valve 122 is in the embodiment of FIG. 11 arranged at the drainage outlet 146 connected in fluid communication to a second fluid channel 119 running through the accumulator end assembly 20,120. Furthermore, to enable the possibility of reflector 100 rotation around the axial axis of the elongated body 103,103' the accumulator end assembly 20,120 includes a peripheral, closed track 147 in which fluid 142 may flow.

In the compressed state shown in FIG. 11 a hollow annular space 150 is formed between the outer (exterior) wall of the first elongated body 103 and the inner (interior) wall of the second elongated body 103', the annular space 150 being at least partly due to the presence of either or both the first 138 and second 139 guiding bands. It is therefore considered advantageous to introduce one or more venting openings 151 in fluid communication with the annular space 150 to avoid any limitations in the telescopic movements of the reflector 100.

Figure 12:
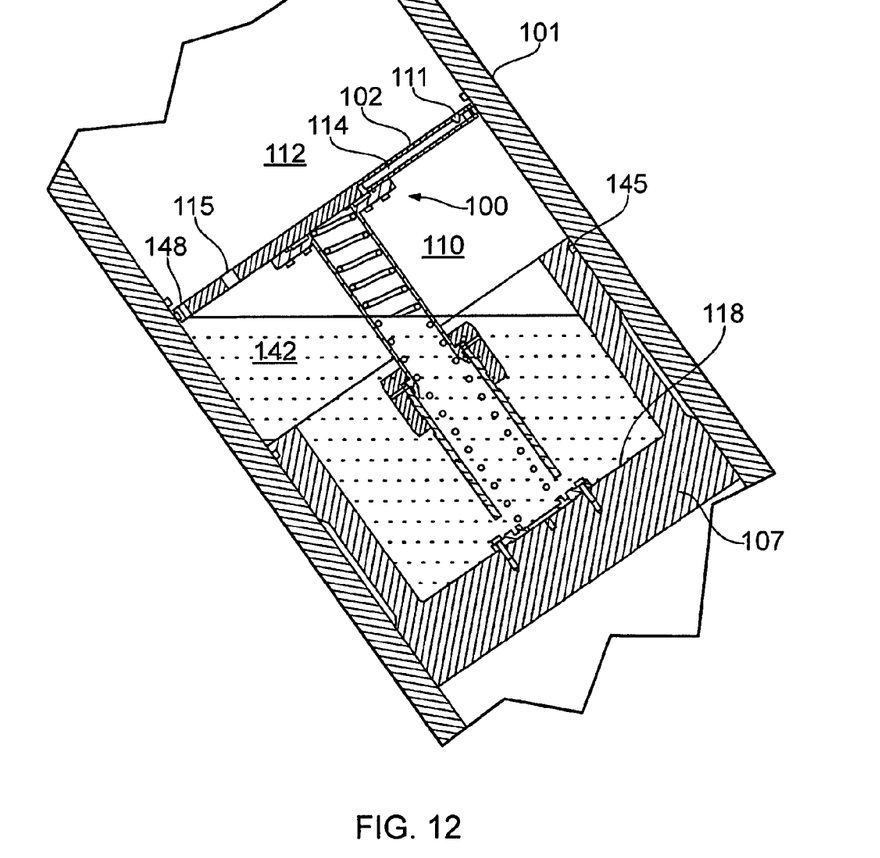
FIG. 12 shows the assembled reflector according to FIGS. 8 A and B, installed in an accumulator, where the accumulator piston is partly submerged into hydraulic fluid during operation.

FIG. 12 shows the reflector 100 in an inclined operational position arranged in a piston accumulator 116. Fluid(s) 142 such as lubrication oil for lubrication of the piston seals 145 have been prefilled in the gas pressure chamber 116" through the above mentioned one or more first 115 and/or second 148 fluid disc openings. The quantity of fluid 142 has been chosen to ensure proper seal lubrication, while at the same time ensuring that the reflector disc 102 is kept at least partly dry. This has the advantage that undesired disturbances of the transmitted and reflected microwaves during measurements of the piston distance (d) due to the presence of fluids situated above the reflector disc 102 is either fully avoided or significantly damped if a leak across the piston 107,107' should occur.

In use, modulated signals in the microwave range, for example in the form of CW signals (CW=continuous wave), are emitted from the at least one antenna/aerial/transducer 4 and launched in to the gas pressure chamber 116". The cylinder wall 101 of the accumulator 2,116 serves as the conducting structure 101 for the wave. The wave is propagated in the accumulator 2,116 until it encounters the surface of the reflector plate 102.

The largest part of the electromagnetic wave is subsequently reflected at the reflector plate 102 since the disc 102 shows an electrical behavior much like a short-circuit. The reflected wave returns via the gas pressure chamber 116" and received by an antenna 4 which may be the same antenna as used for the emission. The phase angle between the emitted and the reflected signal is then measured. If the reflector 100, and thus the piston 107,107', changes position, the path length traveled by the electromagnetic wave inside the gas pressure chamber 116" also changes. The change in path length causes a change in the signal propagation delay and therefore also a change in the phase angle between incoming and reflected signal. The quantitative phase angle change can be used as a measure of the position of the reflector 100. Further, since the distance between this disc 102 and the piston 107,107' is known throughout the operation (i.e. when the surface of the reflector disc 102 has no physical contact with the accumulator end assembly 20,120) also the distance between one or more antenna emitting ends 126 and the piston surface 107 perpendicular to the cylinder walls/conducting structure 101 is known. For further details about the principles of using microwaves to determine distances in cylinders, see publication now U.S. Pat. No. 7,095,944 B2.

By the embodiment of the invention as disclosed in the figures, the applicant has made a solution to the problem stated, namely by providing a solution that makes it easy to substitute or repair the antenna or transmittal line without the need of dismounting the larger elements making up one end of the accumulator. Additionally, the proposed solution enables a solution where the antenna is kept centrally within the accumulator, while at the same time removing the transmittal line or antenna without being in contact with the medium inside the accumulator.

In the preceding description, various aspects of the apparatus according to the invention have been described with reference to the illustrative embodiment. For purposes of explanation, specific numbers, systems and configurations are set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention as stated in the attached claims.

REFERENCE LIST

1 Antenna assembly
2 Piston accumulator
3 Manifold
4 Antenna
5 Pressure line
6 First bore
7 Fluid channel
8 Transmittal line
9 First sealing element
10 Second sealing element
11 First bore orifice
12 End cover
13 Outer longitudinal end
14 Inner longitudinal end
15 First set of screws
15' Corresponding screw holes
16 Second set of screws
17 Flange
18 Third set of screws
19 Third sealing element
20 Accumulator end assembly
21 Cavity
22 Common fluid inlet
100 Reflector
101 Accumulator cylinder wall/conducting structure
102 Reflector disc
103 Elongated body/tube
103' Elongated body/tube
105 First flange
106 Second flange
107 Accumulator piston, base
107' Accumulator piston, axial protruding sides
108 Resilient means/pressure spring
109 First fluid channel
110 Confined space
111 Exit opening/aperture
112 Reflector space
113 Hollow part 114 Reflector bore hole, reflector channel/chamber
115 Inner fluid flow opening
116 Piston accumulator
116' Hydraulic fluid pressure chamber
116" Gas pressure chamber
117 Inner surface of accumulator end assembly
118 Piston surface
119 Second fluid channel
120 Accumulator end assembly
121 Exterior surrounding of the accumulator
122 Drainage valve
126 Antenna emitting end
131 First fastening means
132 Second fastening means
133 Entrance opening/aperture
134 First adapter sleeve
135 Second adapter sleeve
136 Third fastening means
137 Gasket
138 First guiding band
139 Second guiding band
140 Disc guide band
141 Disc opening
141' Plug for disc opening
142 Lubrication fluid
143 Downward directed arrow
144 Upward directed arrow
145 Piston seal
146 Drainage outlet
147 Peripheral, closed track
148 Outer fluid flow opening
149 Guide Track
150 Hollow part
151 Venting opening
153 Locking ring
154 Gas channels
154' Gas channel inlet
154" Gas channel outlet

The invention claimed is:

1. A replaceable antenna assembly for use with a piston accumulator configured for supplying fluid to a hydraulic cylinder, the piston accumulator comprising an end cover, the antenna assembly comprises:
a hollow manifold for flow of fluid; and
an antenna connected axially into or onto the manifold for emitting and receiving electromagnetic waves,
wherein the hollow manifold is connectable to the end cover and configured to be in fluid communication with both the piston accumulator at one end and a pressure line at the other end, said pressure line being connectable to an external high pressure gas bank, and wherein the hollow manifold further comprises:
at least one first bore for transferring signals to and from the antenna; and
a fluid conduit comprising a common, axial fluid inlet diverging into a plurality of fluid channels symmetrically displaced around the circumference of the antenna, thereby ensuring that most of, or all, fluid flows on the radial outside of the antenna during use, and
wherein the manifold and antenna can be removed out of and put into the end cover.

2. The Antenna assembly according to claim 1, wherein the geometrical shape of the at least two fluid channels ensures essentially laminar flow throughput between the manifold and the interior of the piston accumulator.

3. The Antenna assembly according to claim 2, wherein the at least one first bore comprises a first bore orifice in the end closest to the outer circumference of the manifold for providing a fluid-tight connection around the transmittal line.

4. The Antenna assembly according to claim 1, wherein at least one transmittal line is arranged in at least one of the at least one first bore for the transfer of signals.

5. The Antenna assembly according to claim 1, wherein an outer circumference of the manifold is exposed to the surroundings.

6. The Antenna assembly according to claim 1, wherein there is arranged seals to ensure fluid-tight sealing in the connections between the manifold and the external high pressure line and between the manifold and the piston accumulator, respectively.

7. An accumulator end assembly comprising:
the antenna assembly according to claim 1; and
an end cover of a piston accumulator, which end cover comprises at least one gas channel.

8. The accumulator end assembly according to claim 7, wherein the inner surface of the at least one gas channel in the end cover is smooth.

* * * * *